(12) United States Patent
Fang et al.

(10) Patent No.: US 10,746,082 B2
(45) Date of Patent: Aug. 18, 2020

(54) EXHAUST LAYOUT FOR OFF ROAD VEHICLE

(71) Applicant: Zhejiang CFMOTO Power Co., Ltd., Hangzhou, Zhejiang (CN)

(72) Inventors: Ying Fang, Hangzhou (CN); Bingxiang Lyu, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 29 days.

(21) Appl. No.: 16/104,077

(22) Filed: Aug. 16, 2018

(65) Prior Publication Data

US 2019/0055875 A1    Feb. 21, 2019

(30) Foreign Application Priority Data

Aug. 18, 2017 (CN) .................... 2017 2 1042169 U

(51) Int. Cl.
| | |
|---|---|
| *F01N 13/10* | (2010.01) |
| *B60K 13/04* | (2006.01) |
| *F01N 13/18* | (2010.01) |
| *F01N 13/00* | (2010.01) |
| *F01N 1/00* | (2006.01) |
| *F01N 3/10* | (2006.01) |

(52) U.S. Cl.
CPC ............ *F01N 13/107* (2013.01); *B60K 13/04* (2013.01); *F01N 1/00* (2013.01); *F01N 3/10* (2013.01); *F01N 13/002* (2013.01); *F01N 13/007* (2013.01); *F01N 13/009* (2014.06); *F01N 13/1822* (2013.01); *B60Y 2200/20* (2013.01); *F01N 2260/08* (2013.01); *F01N 2260/20* (2013.01); *F01N 2340/02* (2013.01); *F01N 2340/04* (2013.01); *F01N 2590/00* (2013.01); *Y02A 50/2322* (2018.01)

(58) Field of Classification Search
CPC combination set(s) only.
See application file for complete search history.

(56) References Cited

U.S. PATENT DOCUMENTS

| | | | |
|---|---|---|---|
| 4,569,304 A | 2/1986 | Toshima | |
| 5,325,666 A * | 7/1994 | Rutschmann | F01N 3/28 123/692 |
| 6,141,958 A * | 11/2000 | Voss | F01N 3/02 138/177 |
| 8,167,067 B2 * | 5/2012 | Peterson | F01N 3/055 180/68.2 |

(Continued)

*Primary Examiner* — Binh Q Tran
(74) *Attorney, Agent, or Firm* — Jeffrey D. Shewchuk; Shewchuk IP Services, LLC

(57) ABSTRACT

An exhaust system for an off road vehicle includes a main intake pipe running in a generally longitudinal direction on the vehicle, receiving gasses from a first intake pipe for a forward cylinder and from a second intake pipe for a rearward cylinder of an mid-mounted internal combustion engine. A catalytic converter receives gasses from the main intake pipe. Instead of being mounted longitudinally, the catalytic converter extends in a transverse direction, at the rearward end of the exhaust system, behind the axis of the rear wheels. A muffler, located over the axis of the rear wheels, also extends in a transverse direction and receives gasses from the catalytic converter. The muffler outputs the gasses through a tailpipe, which is preferably above and extends wider than the main intake pipe.

17 Claims, 4 Drawing Sheets

(56) References Cited

U.S. PATENT DOCUMENTS

| | | | |
|---|---|---|---|
| 9,422,845 B2* | 8/2016 | Wahlstrom | F01N 3/0233 |
| 9,732,647 B2* | 8/2017 | Daborn | F01N 3/035 |
| 9,776,481 B2 | 10/2017 | Deckard et al. | |
| 2010/0122865 A1* | 5/2010 | Okada | E02F 9/0866 |
| | | | 180/309 |
| 2011/0000201 A1* | 1/2011 | Laube | F01N 1/166 |
| | | | 60/324 |

* cited by examiner

EXHAUST LAYOUT FOR OFF ROAD VEHICLE

CROSS-REFERENCE TO RELATED U.S. APPLICATION(S)

None.

FIELD OF THE INVENTION

The present invention relates to offroad vehicles such as UVs and ATVs, and more particularly to the layout of the exhaust system in such offroad vehicles.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

UVs and ATVs commonly use internal combustion engines, including single and dual cylinder engines, which output exhaust gasses. An exhaust system is used to treat and expel exhaust gasses from the vehicle. Such exhaust systems commonly include a catalytic converter to catalyze a redox reaction in the exhaust gasses and a muffler to reduce noise, connected together with piping and leading to an exhaust pipe so the exhaust gasses are output at the desired location relative to the vehicle. Both the catalytic converter and the muffler are typically generally cylindrical structures, significantly greater in diameter than the piping. Further, more modern vehicles may include anon-board diagnostic ("OBD") system, arranged near the catalytic converter, for real-time monitoring of the catalytic converter.

Particularly when the engine is centrally mounted between the vehicle tires rather than in front of the passengers, the space available for the components of the exhaust system is limited. The space constraints on UVs and ATVs can be much tighter than on many onroad passenger vehicles due to the smaller overall size of the UVs and ATVs. Dual cylinder engines, laid out front-to-rear on the UV or ATV to reduce width, may have one cylinder output exhaust gasses at the front of the engine and the other cylinder output exhaust gasses at the rear of the engine. Use of a two cylinder engine can accordingly make the space constrains even tighter than for a single cylinder UV or ATV, because the piping of exhaust gasses from each cylinder and joining the two exhaust flows can consume considerable space. Better exhaust systems, particularly suited for offroad vehicles such as UVs and ATVs, acceptable for use with dual cylinder front-to-rear mid mounted engines, are needed.

BRIEF SUMMARY OF THE INVENTION

The present invention is an exhaust system for an off road vehicle, and an off road vehicle using such an exhaust system. The exhaust system includes a main intake pipe running in a generally longitudinal direction on the vehicle. A catalytic converter receives gasses from the main intake pipe. Instead of being mounted longitudinally, the catalytic converter extends in a transverse direction, at the rearward end of the exhaust system. A muffler receives gasses from the catalytic converter. The muffler also extends in a transverse direction, forward of the catalytic converter. The muffler outputs the gasses through a tailpipe, which is preferably above and extends wider than the main intake pipe.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
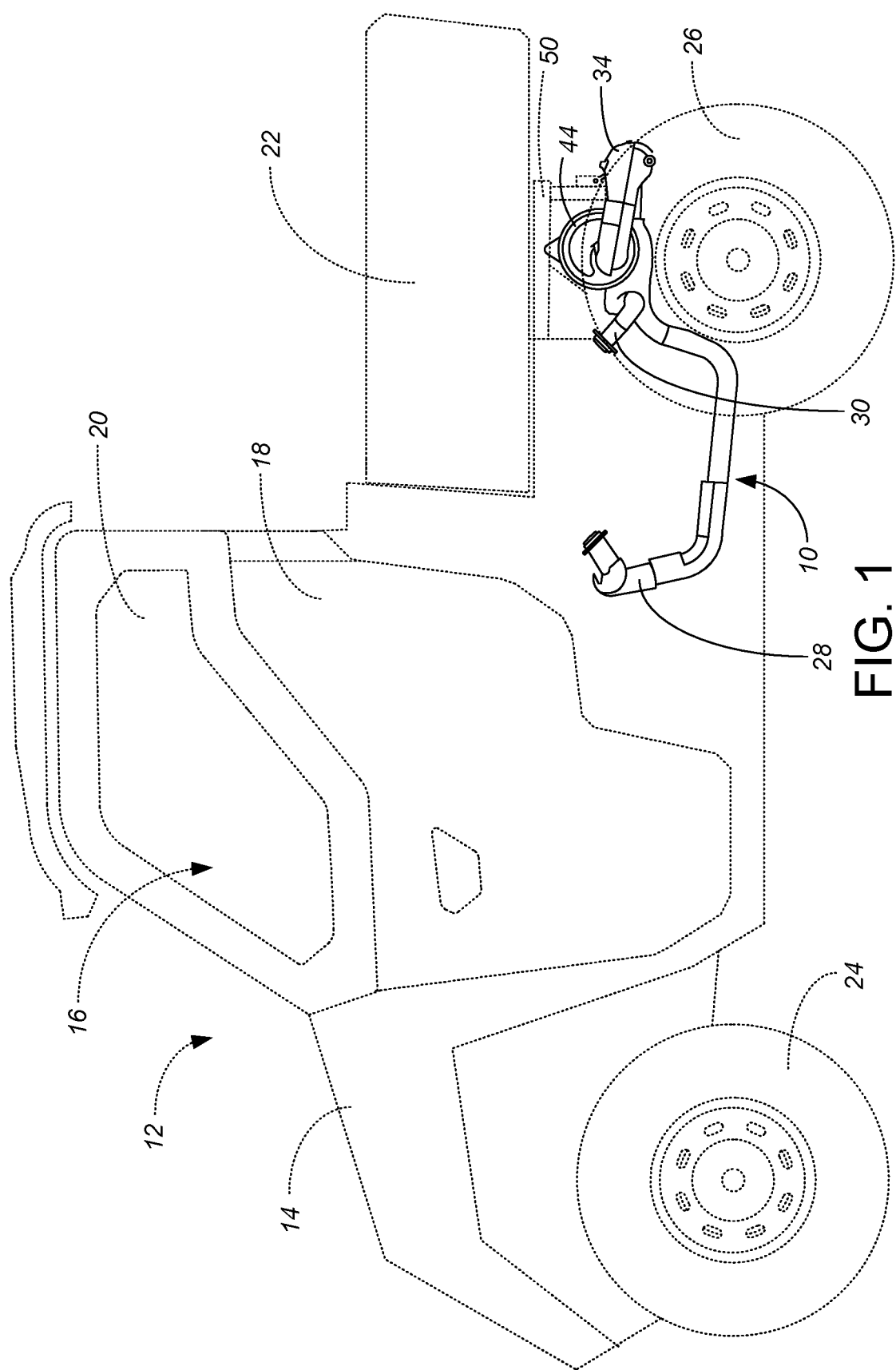
FIG. 1 is a driver's side view of a UV (in dashed lines) showing the exhaust system in accordance with the present invention in solid lines.

As shown in FIG. 1, the present invention involves an exhaust system 10 for use in a UV or ATV 12. The vehicle 12 is depicted with a front hood 14, a passenger compartment 16 with a door 18 and side window 20, and a rear cargo space 22. The vehicle 12 has a mid-mounted engine (not separately shown) which drives the front wheels and tires 24, the rear wheels and tires 26, or both the front and rear wheels, 24, 26. While the present invention is applicable to a single cylinder internal combustion engine, more preferably the engine is a dual cylinder internal combustion engine, mounted front-to-rear in the vehicle 12. The front cylinder outputs gasses toward the front of the engine and into a first intake pipe 28, and the rear cylinder outputs gasses toward the rear of the engine and into a second intake pipe 30.

Figure 3:
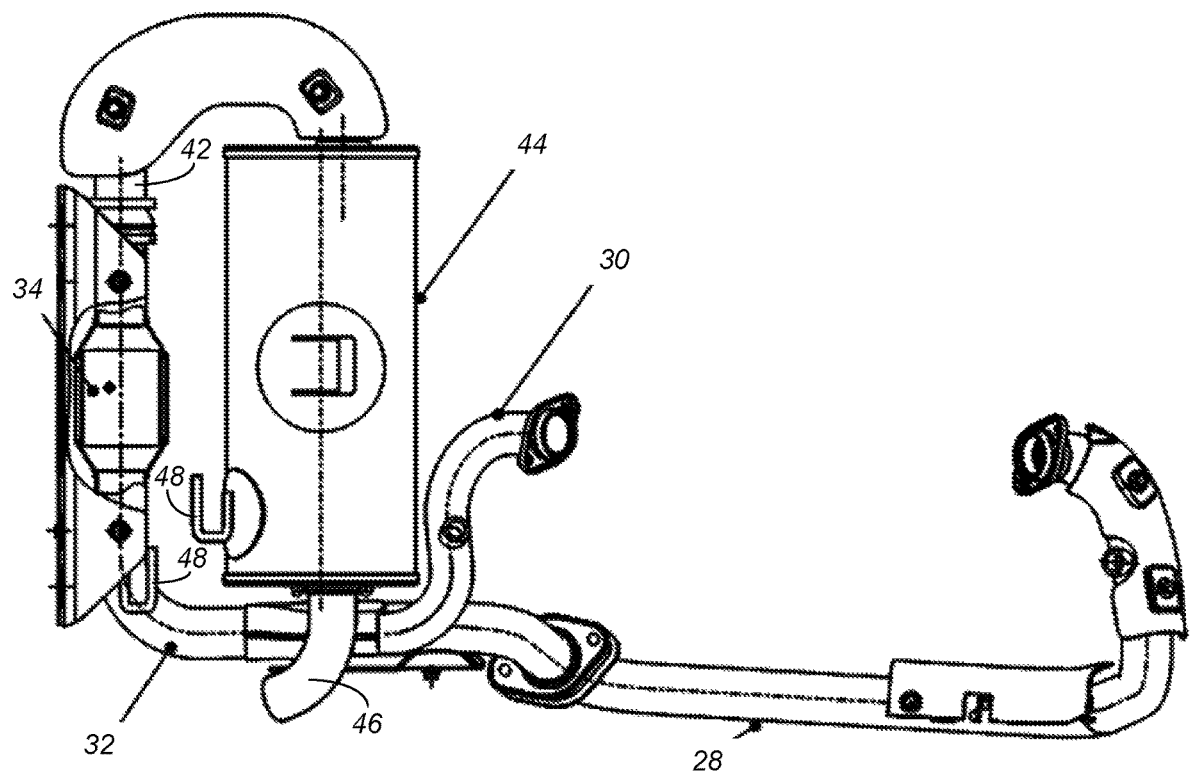
FIG. 3 is a top view of the exhaust system used in the UV of FIGS. 1 and 2.
Figure 4:
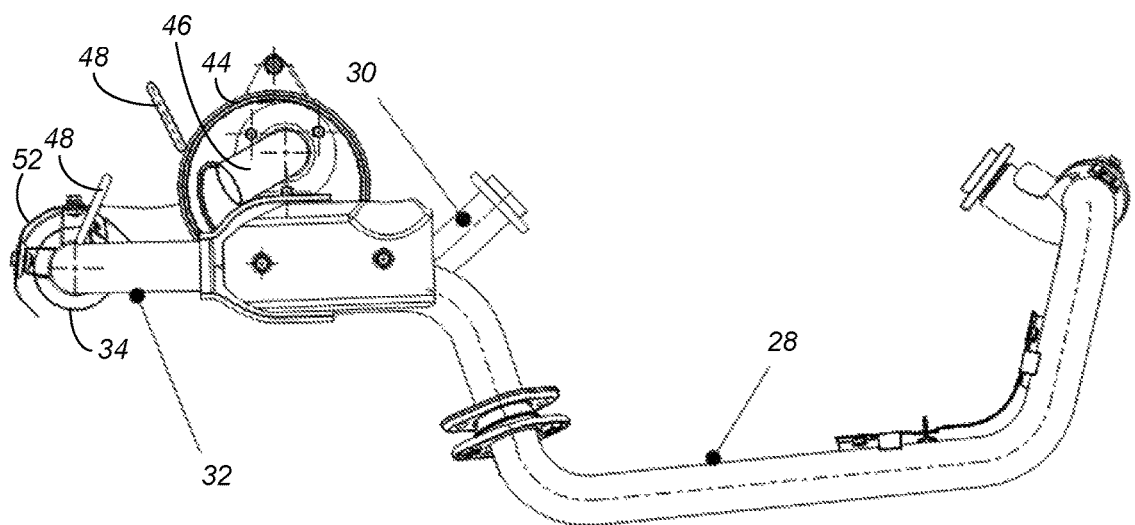
FIG. 4 is a passenger's side view of the exhaust system of FIGS. 1-3.
Figure 5:
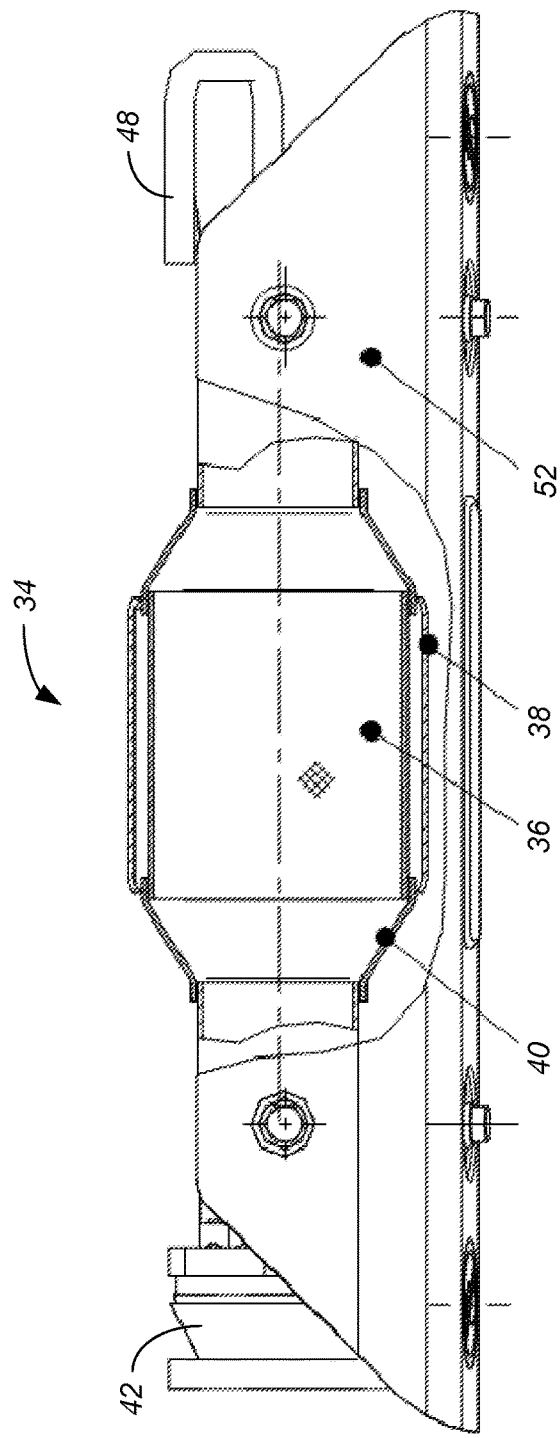
FIG. 5 is a top view of the catalytic converter and catalytic converter heat shield used in the exhaust system of FIGS. 1-4, partially broken away to show the interior structure of the catalytic converter.
Figure 6:
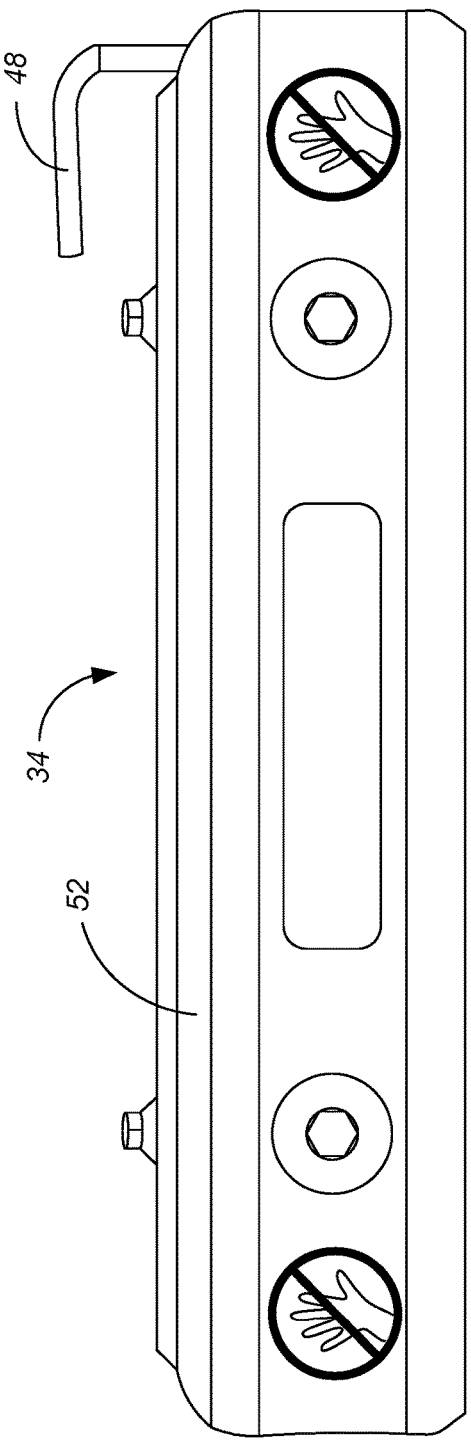
FIG. 6 is a rear view of the catalytic converter and catalytic converter heat shield of FIG. 5.

As better shown in FIGS. 3 and 4, the first intake pipe 28 and the second intake pipe 30 are joined downstream into a main intake pipe 32. The main intake pipe 32 continues to a catalytic converter 34, working on the exhaust gasses just after the junction of the main intake pipe 32, so the exhaust gasses are still at the elevated temperature necessary for proper functioning of the catalytic converter 34. The catalytic converter 34 is preferably a three-way catalytic converter, able to catalyze the conversion of three main pollutants (unburned hydrocarbons, carbon monoxide and nitrogen oxides) simultaneously. As best shown in FIG. 5, such a catalytic converter 34 can include a ceramic monolith 36 coated in catalyst such as platinum or palladium, inside a protective sleeve housing 38. The ends 40 of the housing 38 can be conical, allowing the catalytic converter 34 to be welded in place for an air tight connection with the main intake pipe 32.

Downstream of the catalytic converter 34, a connector pipe 42 provides the catalytic converter output to a muffler 44. The output of muffler 44 is then channeled to atmosphere using the tailpipe 46. Both the muffler 44 and the catalytic converter 34 can include hangers 48 to suspend the exhaust system 10 relative to the frame 50 of the vehicle 12 as known in the art.

When looking at the layout shown in FIGS. 1-4, several features become apparent, to achieve benefits of the present invention over the prior art. First, instead of directing either the catalytic converter 34 or the muffler 44 downstream as is typical in most on road passenger cars, both the catalytic converter 34 and the muffler 44 are mounted transversely on the vehicle 12. This significantly reduces the length of the exhaust system 12 in the longitudinal direction.

Second, instead of having the flow through the catalytic converter 34 he in the same general direction or angled relative to the flow through the muffler 44, in the present invention the flow through the catalytic converter 34 is in the exact opposite direction as the flow through the muffler 44. In the preferred embodiment, the flow through the catalytic converter 34 is from passenger's side to driver's side of the vehicle 12, while the flow through the muffler 44 is from driver's side to passenger's side of the vehicle 12.

Thirdly, despite the fact that the catalytic converter 34 is upstream of the muffler 44, the catalytic converter 34 is mounted in a more rearward location on the vehicle 12, such as behind the axis of the rear wheels 26. Mounting the catalytic converter 34 in such a rearward location allows the main intake pipe 32 to be longitudinally mounted on the vehicle 12, without requiring the second intake pipe 30 to channel the exhaust gasses forward. The second intake pipe 30 can be made shorter, without taking up space for the second intake pipe 30 around the engine. Instead, only the first intake pipe 28 needs extend past the engine. Preferably the first intake pipe 28 extends lower than and to the side of substantially all of the engine.

Fourth, the muffler 44 is mounted relatively high in the vehicle 12, such as above the axis of the rear wheels 26, and the catalytic converter 34 is also mounted high in the vehicle 12. The outlet of the tailpipe 46 is even higher than the main intake pipe 32. This high mounting of the catalytic converter 34 and even higher mounting of the muffler 44 places the catalytic converter 34 to some degree, and the muffler 44 to an even greater degree, in a location on the vehicle 12 that is quite protected. The layout significantly reduces the likelihood that the catalytic converter 34, and moreso the muffler 44, will he damaged as the vehicle 12 traverses over logs, rocks and extremely rough terrain.

Fifth, as best shown in FIG. 1, the layout places the catalytic converter 34 behind the rear extent of the frame 50 with the muffler 44 just inside the rear extent of the frame 50. Both the catalytic converter 34 and the muffler 44 can he hung from the frame 50 with hangers 48 as shown, such as using resilient straps as known in the art.

Sixth, both the transversely mounted catalytic converter 34 and the transversely mounted muffler 44 extend across the longitudinal centerline of the vehicle 12, both substantially centered right to left in the vehicle 12. Meanwhile, the main intake pipe 32 is well offset (to the passenger's side) from the centerline of the vehicle 12. The flow of exhaust gasses is accordingly nearly or equally as much side-to-side on the vehicle 12 as it is longitudinal. In the preferred embodiment, the first and second intake pipes 28, 30 both direct the flow more side-to-side (to the passenger's side) than longitudinal. The main intake pipe 32 keeps the exhaust flow on the passenger's side. The flow then twice crosses the center line, once in the catalytic converter 34 to the driver's side, and then back in the muffler 44 to the passenger's side, before being output on the passenger's side in the tailpipe 46.

Finally, the tailpipe 46 outlet is more forward on the vehicle 12 than the catalytic converter 34, and higher and wider on the vehicle 12 than the main intake pipe 32. Vehicle tailpipes on vehicles are notorious for providing a hot, rusted end of a pipe which can become jagged, sharp and dangerous over time, but the output of the tailpipe 46 of the preferred embodiment is well protected, high and located inside the rear tires 26.

Figure 2:
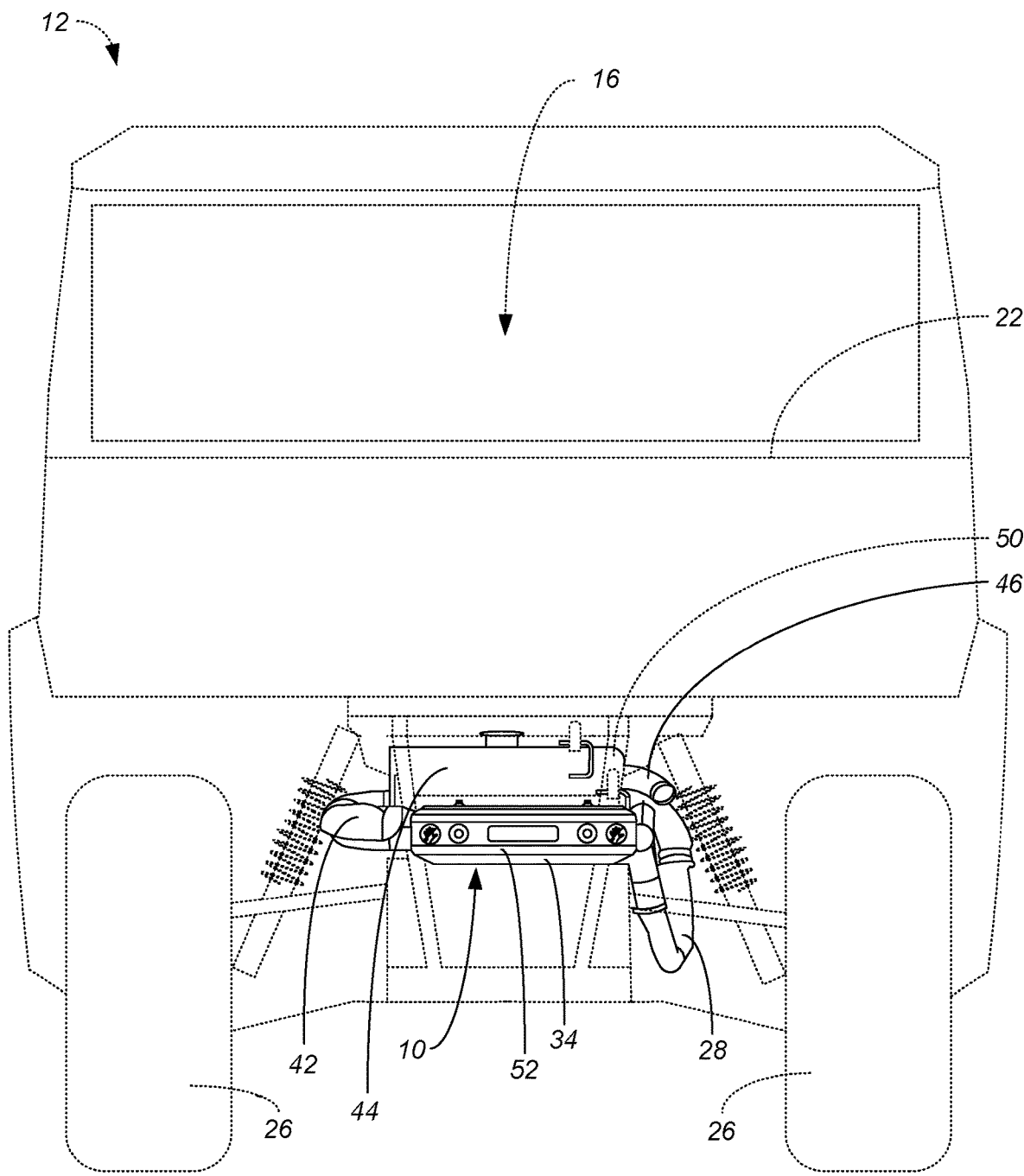
FIG. 2 is a rear view of the UV of FIG. 1.

As best seen in FIGS. 1 and 2, the location of the catalytic converter 34 allows access to the catalytic converter 34 from the rear of the vehicle 12. While such access is beneficial for repair and/or maintenance work, it poses a danger of people or items contacting the catalytic converter 34 particularly while the catalytic converter 34 is very hot, either causing burns or creating a fire hazard. A heat shield 52 is preferably used to reduce or eliminate such contact. The heat shield 52 should cover at least the rearward surface of the catalytic converter 34, and more preferably covers both the rearward and top surface of the catalytic converter 34. The preferred heat shield 52 is bolted to the top and rear of the main intake pipe 32 and to the top and rear of the connector pipe 42 with a spacing bracket. Heat from the catalytic converter 34 is slowly and uniformly dispersed through the heat shield 52.

In the preferred embodiment, the OBD system (not separately shown) may be arranged between the catalytic converter 34 and the muffler 44. If desired or necessary, part or all of the OBD system may occupy additional space behind the catalytic converter 34.

Beyond the benefits discussed above, the overall structure of the exhaust system 10 of the present invention is compact, and the reduction in space occupied by exhaust system 10 facilitates the overall vehicle layout.

Although the present invention has been described with reference to preferred embodiments, workers skilled in the art will recognize that changes may be made in form and detail without departing from the spirit and scope of the invention

The invention claimed is:

1. An exhaust system for an off road vehicle, comprising:
   a main intake pipe running in a generally longitudinal direction;
   a catalytic converter receiving gasses from the main intake pipe, the catalytic converter extending in a transverse direction, such that gasses flow in the catalytic converter primarily in a first transverse direction from a catalytic converter input side on one end of the catalytic converter to a catalytic converter output side on an opposing end of the catalytic converter; and
   a muffler receiving gasses from the catalytic converter, and outputting the gasses through a tailpipe, the muffler extending in a transverse direction, such that gasses flow in the muffler primarily in a second transverse direction which is opposite the first transverse direction, from a muffler input side on one end of the muffler to a muffler output side on an opposing end of the muffler;
   wherein the catalytic converter is located rearwardly of the muffler.

2. The exhaust system of claim 1, for use with an off road vehicle having a dual cylinder internal combustion engine, further comprising:

a first intake pipe directing exhaust gasses from a forward cylinder, in a transverse direction of the vehicle, to the main intake pipe, and a second intake pipe directing exhaust gasses from a rearward cylinder, in a transverse direction of the vehicle, to the main intake pipe.

3. The exhaust system of claim 2, wherein the first intake pipe further runs longitudinally along a side of the engine, generally lower than the engine and lower than the catalytic converter and muffler.

4. The exhaust system of claim 3, wherein the second intake pipe does not transmit exhaust gasses forwardly.

5. The exhaust system of claim 1, wherein the catalytic converter is located rearwardly of a rear extent of a vehicle frame.

6. The exhaust system of claim 5, further comprising:
a heat shield protecting a rear side of the catalytic converter.

7. The exhaust system of claim 6, wherein the heat shield also covers a top side of the catalytic converter.

8. The exhaust system of claim 1, wherein the output of the catalytic converter is connected to the muffler with a U-shaped connector pipe.

9. The exhaust system of claim 1, wherein the tailpipe extends above the main intake pipe, to expel gas flow wider than the main intake pipe.

10. An off road vehicle, comprising:
a passenger compartment and an internal combustion engine in a middle of the vehicle between front and rear wheels, and an exhaust system dispelling gasses from the internal combustion engine, the exhaust system comprising:
a main intake pipe running in a generally longitudinal direction;

a catalytic converter receiving gasses from the main intake pipe, the catalytic converter extending in a transverse direction; and a muffler receiving gasses from the catalytic converter, and outputting the gasses through a tailpipe, the muffler extending in a transverse direction;

wherein the catalytic converter is located rearwardly of the muffler.

11. The off road vehicle of claim 10, wherein the muffler is mounted above an axis of the rear wheels.

12. The off road vehicle of claim 10, wherein the engine is a dual cylinder internal combustion engine, wherein the exhaust system further comprises:

a first intake pipe directing exhaust gasses from a forward cylinder, in a transverse direction of the vehicle, to the main intake pipe, and a second intake pipe directing exhaust gasses from a rearward cylinder, in a transverse direction of the vehicle, to the main intake pipe.

13. The off road vehicle of claim 12, wherein the first intake pipe further runs longitudinally along a side of the engine, generally lower than the engine and lower than the catalytic converter and muffler.

14. The off road vehicle of claim 13, wherein the second intake pipe does not transmit exhaust gasses forwardly.

15. The off road vehicle of claim 14, wherein the catalytic converter is located rearwardly of a rear extent of a vehicle frame.

16. The off road vehicle of claim 15, further comprising:
a heat shield protecting a rear side of the catalytic converter.

17. The off road vehicle of claim 16, wherein the tailpipe extends above the main intake pipe, to expel gas flow wider than the main intake pipe.

* * * * *